March 18, 1924.  1,486,880

F. H. GRIFFITHS

LIQUID DISPENSING AND MEASURING DEVICE

Filed Feb. 7, 1922  3 Sheets-Sheet 1

INVENTOR
Francis H. Griffiths
BY
ATTORNEYS

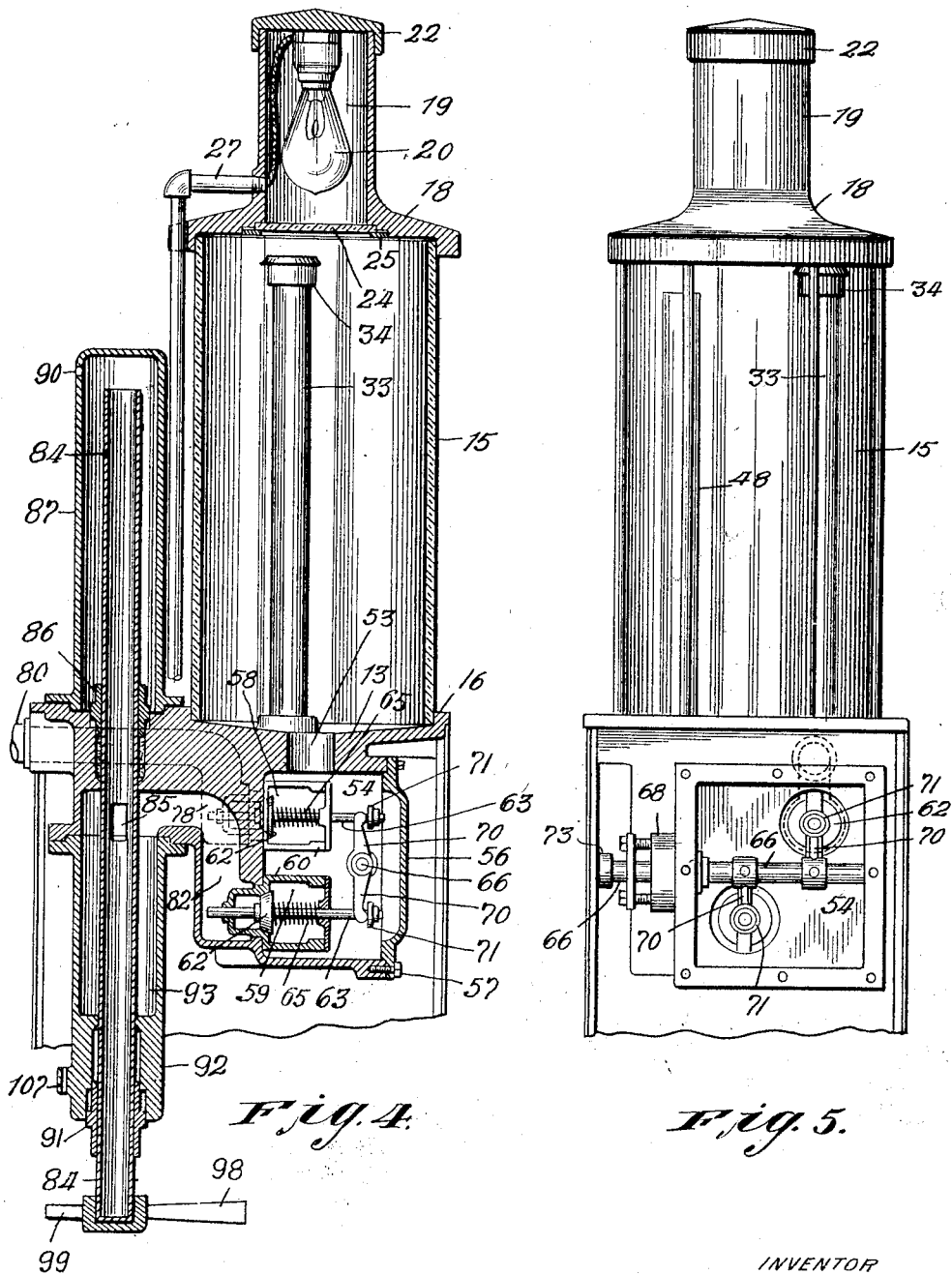

March 18, 1924.

F. H. GRIFFITHS 1,486,880

LIQUID DISPENSING AND MEASURING DEVICE

Filed Feb. 7, 1922    3 Sheets-Sheet 3

INVENTOR
Francis H. Griffiths
BY
ATTORNEYS

Patented Mar. 18, 1924.

1,486,880

UNITED STATES PATENT OFFICE.

FRANCIS H. GRIFFITHS, OF SPRINGFIELD, MASSACHUSETTS, ASSIGNOR OF ONE-HALF TO J. EDWARD EVANS, OF NEW YORK, N. Y.

LIQUID DISPENSING AND MEASURING DEVICE.

Application filed February 7, 1922. Serial No. 534,730.

*To all whom it may concern:*

Be it known that I, FRANCIS H. GRIFFITHS, a citizen of the United States, residing in the city of Springfield, county of Hampden, and State of Massachusetts, have invented certain new and useful Improvements in Liquid Dispensing and Measuring Devices, of which the following is a specification.

This invention is particularly applicable to liquid measuring and dispensing devices used in connection with the vending of gasoline and oils of any kind. It is, however, not limited to such fields of usefulness, but has a wide variety of applications to the dispensing and measuring of liquids.

The general object of the invention is to provide a new and improved liquid dispensing and measuring device which is simple in construction and efficient in operation, and which will measure with accuracy different desired quantities of the liquid to be dispensed.

In many liquid dispensing and measuring devices heretofore devised, the construction is such that, even when the device is honestly manipulated, inaccurately measured quantities of liquid are dispensed. In others, while the device may dispense accurate amounts of liquid if properly adjusted and actuated, it is a more or less easy matter for a dishonest operator, without being detected by an ordinary observer, to so manipulate the device that the amounts of liquid dispensed by it will be less than the amounts which should be dispensed under the conditions under which the device is supposed to be operating.

A particular object of my invention is to provide a new and improved form of liquid dispensing and measuring device which will not only measure accurately when normally manipulated, but which cannot readily be dishonestly operated in such a manner as to give short measure. One of the features of my dispensing device is a measuring tank which can be readily observed by the purchaser of the liquid to be dispensed; and, of the purchaser takes the trouble to observe the liquid level in this tank at the beginning of and at the end of the dispensing operation, he can feel confident that no manipulation of the mechanism by the operator can affect the accuracy of the amout of liquid which has actually been dispensed.

Figures 1, 2, 3:
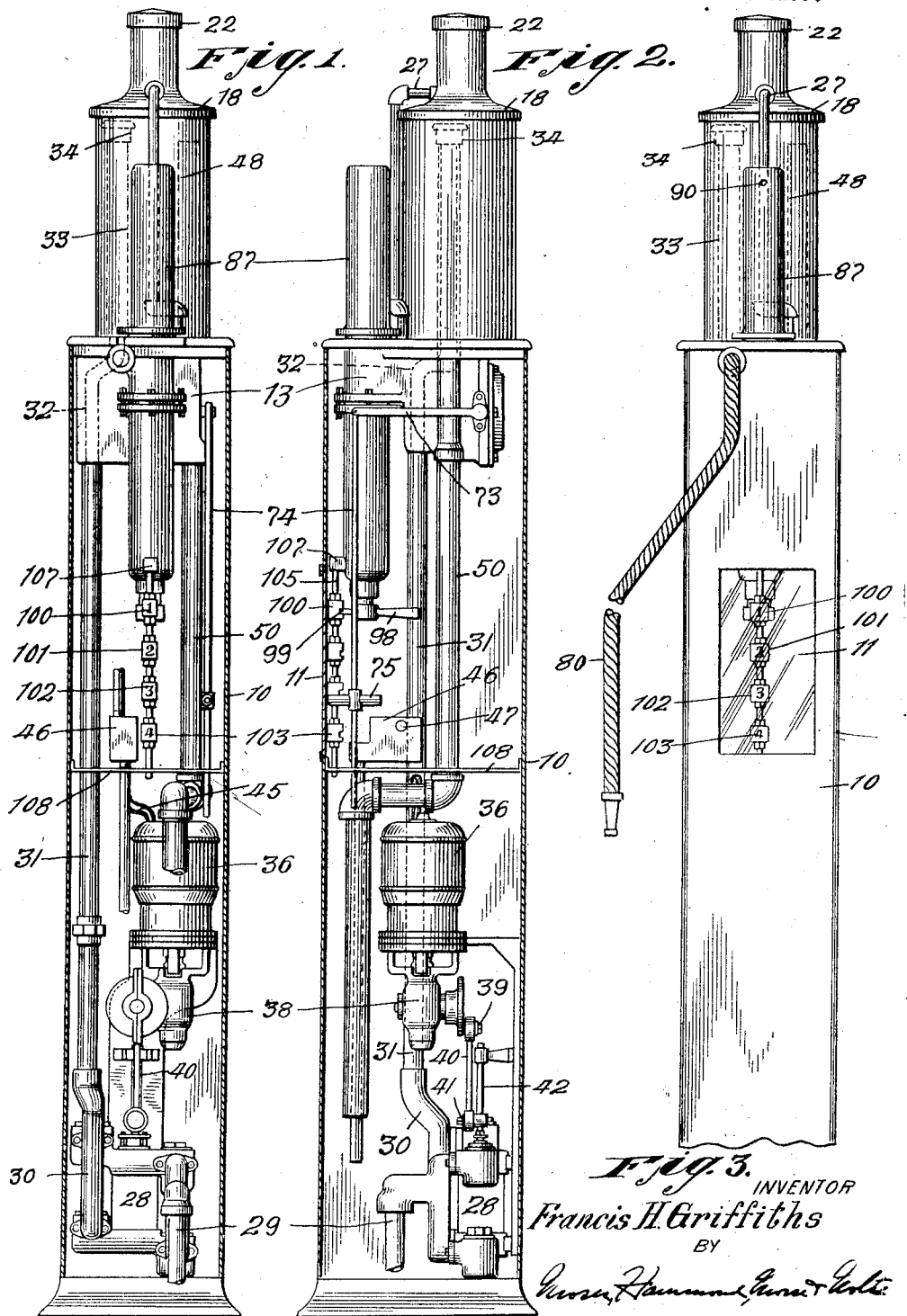
Figure 6:
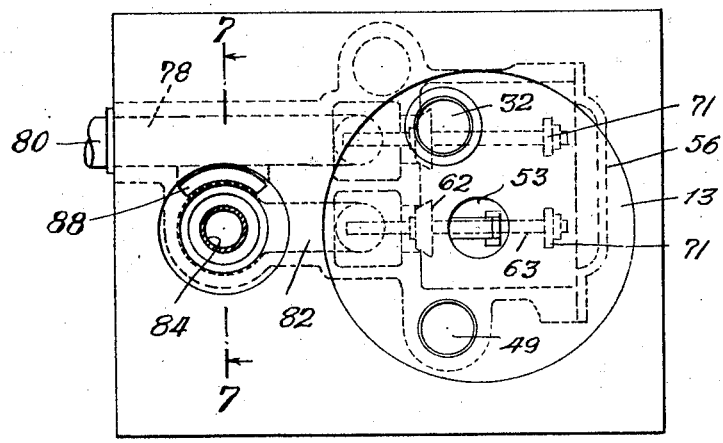
Figure 7:
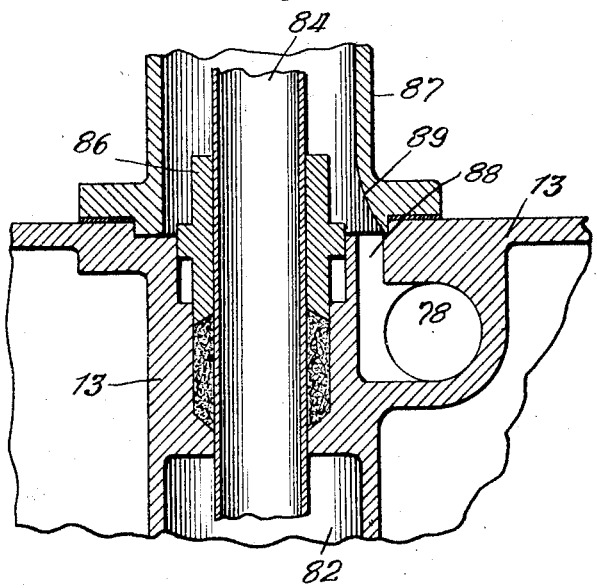

The invention will be understood from the following description, taken in connection with the accompanying drawings, in which a preferred embodiment of the invention is illustrated, and in which Figure 1 is an elevation of the device, the dispensing hose being omitted, and the casing being removed so as to show the mechanism; Figure 2 is an elevation taken at right angles to Figure 1; Figure 3 is an elevation similar to Figure 1, but with the casing and the dispensing hose attached, the bottom portion of the device being omitted; Figure 4 is a sectional elevation of the upper portion of the device, showing particularly the parts thru which the liquid passes; Figure 5 is an elevation taken at right angles to Figure 4, the cap plate over the valve chamber being removed to show the mechanism within; Figure 6 is a plan view of the top of the device, with the measuring tank and the cover over the measuring pipe removed; and Figure 7 is a fragmentary sectional elevation on the line 7—7 of Figure 6.

Referring to the drawings, the various parts of the dispensing and measuring device are shown as contained within a casing 10 which may be of sheet metal secured to a suitable frame which may also support the various parts of the device hereinafter described. The casing 10 may be provided with a window 11 thru which certain parts hereinafter described are visible, and with a door (not shown) of any suitable kind thru which access may be had to the manually operable elements by which the dispensing and measuring device is controlled. Mounted above the casing 10 and upon the frame by which the casing is supported, is a casting 13, hereinafter described in detail, which supports a measuring tank which may consist of an open ended hollow glass cylinder 15 which rests within a flange 16 on the casting 13, and at its top is covered by a cap 18. The cap 18 may be provided with a recess 19 within which may be mounted an incandescent lamp 20, the latter being supported from a cover 22 which may be removable from the cap 18, the bottom of the recess 19 being closed by a piece of glass 24 secured in an annular recess in the bottom of the cap 18 in any suitable manner, as by a bezel 25. Light from the lamp 20 radiates downwardly thru the glass 24 and illuminates the contents of the measuring tank 15. Current for the lamp 20 may be supplied in any suitable manner, as by wires threaded within a conduit 27 and connected to a suitable source of current supply.

The liquid to be dispensed and measured may be supplied to the measuring tank in any suitable manner and by any suitable means. As shown, this means comprises a pump 28, of any suitable form, having an intake pipe 29 connected to a source of liquid supply, such as a tank located under the ground. The outlet pipe 30 of the pump is connected to a riser pipe 31 which extends upwardly and is threaded into a cored hole 32 extending thru the casting 13 into the measuring tank. Threaded into the upper end of the hole 32 and extending vertically within the measuring tank nearly to the top thereof, is a filling pipe 33 which may have secured to its end an umbrella cap 34 which directs the liquid downwardly as it escapes from the end of the filling pipe. The pump 28, which is shown as being of the piston type, may be driven by an electric motor 36 having a vertically arranged shaft which is geared to the pump thru the medium of speed reduction gearing enclosed in a casing 38, a crank 39 and a connecting rod 40 pivotally connected at 41 to the piston rod 42 of the pump. The motor 36 receives current thru wires 45 leading thru the conduit 27 to a suitable source of current supply, the starting and stopping of the motor being controlled by a switch 46 of the type which maintains the controlled circuit closed only while a button 47 is held depressed, the switch being arranged to open when this button is released.

In addition to the filling pipe 33 thru which the measuring tank is filled, the latter is provided with an overflow pipe 48 thru which excess liquid in the measuring tank may flow back to the source of supply. This pipe 48, like the pipe 33, at its lower end is threaded into the upper end of a hole 49 cored thru the casting 13; and threaded into the lower end of the hole 49 is a pipe 50 which leads to the source from which the pump 28 draws the liquid to be dispensed. The upper end of the overflow pipe 48 is arranged at the level in the measuring tank corresponding with the maximum amount of liquid to be measured by the device in one operation thereof; that is, if the maximum amount which the device is intended to dispense and measure at one operation is five gallons, the overflow pipe 48 is so arranged that it will drain off from the measuring tank any liquid in excess of the five gallon amount. Since both the filling pipe 33 and the overflow pipe 48 are immovable, it is impossible to drain the measuring tank thru them below the level corresponding to the maximum amount which the tank is intended to measure.

The means whereby the liquid in the measuring tank is dispensed, either as a whole or in fractional amounts, will now be described. Referring to Figure 4, the casting 13 is shown as provided with an opening 53 thru which the contents of the measuring tank may be drained into a valve chamber 54 formed in the casting 13 and provided with a cover 56 which may be secured in place by bolts 57 or in any other suitable manner. Extending from the valve chamber 54, are two cored passages within the casting 13, and communication between the chamber 54 and these conduits is controlled by valves 58 and 59 which may be similar in construction. These valves are shown as having valve cages 60, removably mounted in the mouths of the conduits leading from the valve chamber 54, said cages having valve seats with which co-operate valves 62 mounted on valve rods 63 which are slidable in the cages 60, springs 65 being provided for biasing the valves to their closed positions. In connection with these valves, 58 and 59, means is provided whereby only one of said valves can be opened at any one time. This means comprises a pivoted valve operating mechanism which co-operates with said valves and is arranged to open one valve when said mechanism is rotated in one direction, and to open the other valve when said mechanism is rotated in the opposite direction. As shown, this mechanism comprises a shaft 66 journaled in opposite walls of the chamber 54 and at one end extending outwardly thru a stuffing box 68 of any well known type. Mounted on and secured to the shaft 66 are arms 70 having bifurcated ends adapted to straddle the valve rods 63 and co-operate with discs 71 secured thereto. At its outer end, the shaft 66 has secured thereto a horizontally extending lever 73 to the outer end of which is pivotally connected an actuating rod 74 which extends downwardly and may be provided with a handle 75. With this arrangement, it is obvious that when the rod 74 is moved upwardly or downwardly the lever 73 will be correspondingly moved and will rotate the shaft 66 in one direction or the other, thereby causing one or the other of the levers 70 to move the corresponding valve stem 63 and open the corresponding valve 58 or 59.

A passage 78, which communicates with the valve chamber 54 thru the valve 58, extends first upwardly and then horizontally thru the casting 13 and at its outer end is provided with means, such as internal threads, whereby a dispensing hose or pipe 80 may be connected thereto. When, therefore, the valve 58 is opened, the contents of the measuring tank is free to flow from the tank thru the opening 53 into the valve chamber 54, thru the valve 58 and the passage 78 to the dispensing hose 80.

The opening 53, valve chamber 54 and passage 78 thus constitute a conduit through which the contents of the tank may be delivered directly to the dispensing hose 80.

Another conduit is provided for delivering the contents of the tank to the dispensing hose 80 and which has therein means whereby the level to which the measuring tank is drained through said conduit may be controlled. This second conduit includes a passage 82 formed in the casting 13 and communicating with the chamber 54 through a valve 59, a chamber 93 with which the passage 82 communicates, and a gauging pipe 84 which extends through the chamber 93 and communicates therewith through an opening or port 85, the lower end of said pipe being closed and the upper end, which constitutes the discharge end, being open. This pipe 84 is vertically slidable through the chamber 93 and passes through both the bottom and top of said chamber, stuffing boxes 91 and 86 being provided to make a tight joint. The upper discharge end of the pipe 84 which extends through the stuffing box 86 is covered by a cylindrical casing 87, which is bolted to a seat on the top of the casting 13 provided for that purpose. The space within the casing 87 is in communication with the passage 78 leading to the dispensing hose 80 through an annular cored opening 88, best shown in Figs. 6 and 7, a portion of the lower inside edge of the casing 87 being cut away as shown at 89 adjacent the opening 88. The casing 87 is provided with an air vent 90 near its upper end which, as hereinafter explained. prevents any siphon action through the dispensing hose 80.

The second conduit, therefore, through which the contents of the tank 15 may be dispensed includes the chamber 54, passage 82, chamber 93 and gauging pipe 84, this conduit being controlled by the valve 62. This second conduit has communication with the dispensing hose 80 through the casing 87, opening 88 and part of the passage 78, these forming a third conduit.

The length of the chamber 93 is such that throughout the movement of the pipe 84, the opening 85 therein is always in communication with the chamber 93 and the passage 82. The stuffing boxes 86 and 91 may be of any well known form, and as shown comprise glands which are threaded into the castings 13 and 92 respectively and serve to compress packing material located in annular cavities between the pipe 84 and those castings. From the foregoing description, it will be apparent that when the valve 62 is opened there will be a passage for the liquid from the measuring tank, thru the opening 53, the valve chamber 54, the valve 62, passage 82, the opening 85 into the pipe 84, and thru the latter and its open top end into the chamber within the casing 87 from which the liquid is free to flow thru the annular opening 88 into the passage 78 and thence to the dispensing hose 80. It will also be apparent that when the valve 62 is opened the liquid will be drained from the tank 15 only to the level of the top or discharge end of the gauging pipe 84 and the vertical position of said pipe, therefore, determines the amount which will be withdrawn from the tank 15.

As stated above the gauging pipe 84 is vertically adjustable and, therefore, by properly adjusting the position thereof the tank 15 may be drained to any desired level.

Mounted on the bottom of the pipe 84 is a handle 98 by which the pipe 84 may be raised and lowered. The hub of the handle 98 is preferably provided with a lug 99 adapted to co-operate with slots in stops 100, 101, 102 and 103 adjustably mounted on a rod 105 which may be secured in a stationary position in any suitable manner, as by being mounted in a lug 107 extending from the casting 91 and in one of the cross frames 108. The length of the pipe 84 is such, and the stops 100, 101, 102 and 103 are so located, that movement of the handle 98 into co-operation with any one of these stops results in locating the upper end of the pipe 84 on a level corresponding to a certain fractional portion of the measuring tank. For example, if the capacity of the measuring tank is five gallons, movement of the handle 98 into engagement with the stops 100, 101, 102 and 103, respectively, will result in locating the top of the pipe 84 on a line with the one, two, three and four gallon levels of the measuring tank, counting from the top thereof.

The mode of operation of the dispensing and measuring device is as follows: Assuming that the device has been assembled and connected with a source of supply which, in the case of gasoline, may be a tank located under ground, depression of the button 47 of the motor controlling switch 46 will start the motor driven pump in operation and keep it in operation as long as the button 47 is held depressed. By the operation of the pump 28, liquid will be drawn thru the pipe 29 and will be forced upwardly thru the outlet pipe 30, riser pipe 31, cored hole 32 in the casting 13, and filling pipe 33 into the measuring tank, and thru the opening 53 into the valve chamber 54. Assuming, as above stated, that this is the first operation of the pump after assembly thereof, the valve 62 should be opened momentarily by pulling down on the handle 75, in order to allow the liquid to flow from the valve chamber 54 thru the valve 59 and fill the conduit 82, chamber 93 and pipe 84. The valve 58 should also be opened momentarily in order to let the liquid fill the lower portion of the conduit 78. Thereafter, during use of the device, these conduits and passages will always be maintained filled regardless of the manipulation of the device, as hereinafter explained. When the measuring tank has been filled sufficiently so that the liquid is overflowing into the overflow pipe 48 leading back to the source of supply, the operator releases the button 47 and the motor-driven pump stops. As soon as the liquid in the measuring tank above the level of the overthrow pipe 48 has flowed out thru that pipe, the liquid stands in the measuring tank at the height corresponding to the maximum amount of liquid, say five gallons, which the device is intended to dispense at one operation.

If it is desired to dispense at one time the whole of the contents of the measuring tank, the handle 75 is raised, thereby opening the valve 58, whereupon the liquid in the tank flows therefrom thru the opening 53, valve chamber 54, valve 58, and passage 78 to the dispensing hose 80. The vent 90 in the casing 87 admits air and will prevent any tendency for the dispensing hose 80 to siphon the liquid out of the valve chamber 54 below a level corresponding approximately with the bottom of the horizontal portion of the conduit 78.

If, however, the demand is for only a portion of the liquid in the measuring tank, say, one, two, three or four gallons, the gauging pipe 84 is adjusted, either before or after the measuring tank is filled, to the height corresponding to the amount of liquid to be dispensed, by moving the handle 98 until the lug 99 thereon co-acts with the appropriate stop 100, 101, 102 or 103. The handle 75 is then depressed, and the valve operating mechanism opens the valve 62 which allows the liquid to flow from the measuring tank thru the opening 53 into the valve chamber 54, thru the valve 62, passage 82, chamber 93 and opening 85 into the pipe 84 out of the top of which the liquid flows, until the level in the measuring tank has been reduced to the level corresponding to the top of the pipe 84 and to the amount of liquid desired. The liquid flowing out of the top of the pipe 84 falls downwardly within the casing 87, passes thru the cored opening 88 into the passage 78, and thence to the dispensing hose 80. The vent 90 in the casing 87 prevents any siphon action, and causes the flow to stop when the liquid in the measuring tank has fallen to the level of the top of the tube 84.

It will be apparent that, with my device, movement of the measuring pipe 84 does not in the least affect the accuracy of the measurements. This is because the pipe 84, chamber 93 and conduit 82 are at all times maintained full of liquid; and because movement of the pipe 84 does not at all change the capacity of the pipe 84, the chamber 93 and the passage 82. In other words, the pipe 84, in all of its positions, displaces the same amount of liquid within a portion of the device which is always maintained filled.

Besides insuring accurate measurement under all conditions, my device has the added advantages, among others, that it not only allows the measuring tank to be quickly drained of its maximum amount, but also that it permits fractional amounts to be drawn from the dispensing tank without first returning to the source of supply an excess over the amount which it is desired to dispense, as in the case of many devices heretofore used.

While I have shown one form in which my invention may be embodied, I realize that this form may be modified in many respects without departing from the spirit of the invention, and it is my intention in the appended claims to cover all equivalent structures which come within the scope thereof.

What I claim is:

1. In a liquid dispensing and measuring device, a measuring tank, means for filling said tank, and means for draining said tank to different levels comprising a conduit communicating with said tank and having an outlet, a part of said conduit being adjustable as to the level of its outlet, a valve in said conduit located between the tank and said outlet, and a second conduit thru which the liquid flowing from the outlet in the first conduit is dispensed.

2. In a liquid dispensing and measuring device, a measuring tank, means for filling said tank to a certain level, and means for draining said tank to different levels comprising a conduit communicating with the bottom of said tank and having an outlet, a part of said conduit being adjustable as to the level of its outlet, a valve in said conduit located between the tank and said outlet, and a second conduit thru which the liquid flowing from the outlet of the first conduit is dispensed.

3. In a liquid dispensing and measuring device, a measuring tank, means for filling said tank, and means for draining said tank to different levels comprising a conduit communicating with said tank and having an outlet, a part of said conduit being adjustable as to the level of said outlet, a valve in said conduit located between the tank and said outlet, a second conduit thru which the liquid flowing from the outlet in said first conduit is dispensed, a third conduit thru which liquid may pass from said tank directly to the second mentioned conduit, and a valve in said third mentioned conduit.

4. In a liquid dispensing and measuring device, a measuring tank, means for filling said tank, and means for draining said tank to different levels comprising a conduit communicating with said tank and having an outlet, a part of said conduit being adjustable as to the level of said outlet, a normally closed valve in said conduit located between the tank and said outlet, a second conduit thru which the liquid flowing from the outlet in said first conduit is dispensed, a third conduit thru which liquid may pass from said tank directly to the second mentioned conduit, a normally closed valve in said third mentioned conduit, and means whereby only one of said valves can be opened at any one time.

5. In a liquid dispensing and measuring device, a measuring tank, means for filling said tank, and means for draining said tank to different levels comprising a conduit communicating with said tank and having an outlet, a part of said conduit being adjustable as to the level of said outlet, a normally closed valve in said conduit located between the tank and said outlet, a second conduit thru which the liquid flowing from the outlet in said first conduit is dispensed, a third conduit thru which liquid may pass from said tank directly to the second mentioned conduit, a normally closed valve in said third mentioned conduit, and a pivoted valve operating mechanism co-operating with said valves and arranged to open one valve when said mechanism is rotated in one direction and to open the other valve when said mechanism is rotated in the opposite direction.

6. In a liquid dispensing and measuring device, a measuring tank, means for filling said tank, means for draining said tank comprising a valve chamber communicating with said tank, a conduit extending from said valve chamber, a dispensing pipe connected to said conduit, a valve controlling communication between said valve chamber and said conduit, a second conduit communicating with said valve chamber, a valve controlling communication between the second conduit and said valve chamber, a vertically arranged movable pipe having a closed bottom end and an open upper discharge end and an opening intermediate the ends communicating with said second conduit, and means for directing liquid flowing from the upper end of said adjustable pipe to the dispensing pipe.

7. In a liquid measuring and dispensing device, the combination with a measuring tank, of an outlet pipe, means connecting said tank and outlet pipe, said outlet pipe having a closed bottom and an open upper discharge end and always filled to the discharge end with the liquid to be dispensed, said pipe having its discharge end vertically adjustable between positions below the top and above the bottom of the tank, whereby the tank can be drained to different levels by adjusting the level of said discharge end.

8. In a liquid dispensing and measuring device, the combination with a measuring tank, of an outlet pipe, means connecting said tank and outlet pipe, said outlet pipe having a closed bottom and an open upper discharge end and always filled to the discharge end with the liquid to be dispensed, a valve controlling the flow of liquid through said pipe, the latter having its discharge end vertically adjustable between positions below the top and above the bottom of the tank, whereby the tank can be drained to different levels by an adjustment of said discharge end.

9. In a liquid dispensing and measuring device, the combination with a measuring tank, of means for draining the tank to different levels including a chamber communicating with the tank which is always filled with the liquid to be dispensed, a vertically-adjustable gauging pipe passing vertically through said chamber, said pipe having an opening which communicates with the chamber in all positions of the pipe and also having a closed lower end and an open upper discharge end.

10. In a liquid dispensing and measuring device, in combination with a measuring tank, means for draining the tank to different levels comprising a vertically adjustable pipe having an open upper discharge end and a closed lower end, means for connecting said pipe with said measuring tank, and a valve located in said means between the measuring tank and said adjustable pipe for controlling the flow of liquid thru said adjustable pipe.

11. In a liquid dispensing and measuring device, a measuring tank, a valve chamber located below said tank and communicating therewith, two normally closed valves controlling ports communicating with said valve chamber, means for opening either of said valves while the other remains closed, a passage leading from one valve port, a dispensing pipe connected thereto, a passage leading from the other valve port to the first passage, and a vertically adjustable pipe having an open end interposed in said last mentioned passage and regulating the level to which the tank may be drained thru that passage.

12. In a liquid dispensing and measuring device, the combination with a measuring tank, of a chamber communicating with the tank and always filled with liquid to be dispensed, a gauging pipe passing vertically through said chamber and having a lower closed end and an upper discharge end, said pipe having communication with the chamber in all positions of the pipe, a dispensing hose and means for delivering to the dispensing hose the liquid discharged from the gauging pipe, said gauging pipe being vertically adjustable thereby to drain the measuring tank to different levels.

In testimony whereof I have affixed my signature to this specification.

FRANCIS H. GRIFFITHS.